June 7, 1960 M. H. BODMER ET AL 2,940,078
DIRECTIVE AERIAL
Filed July 25, 1957 3 Sheets-Sheet 1
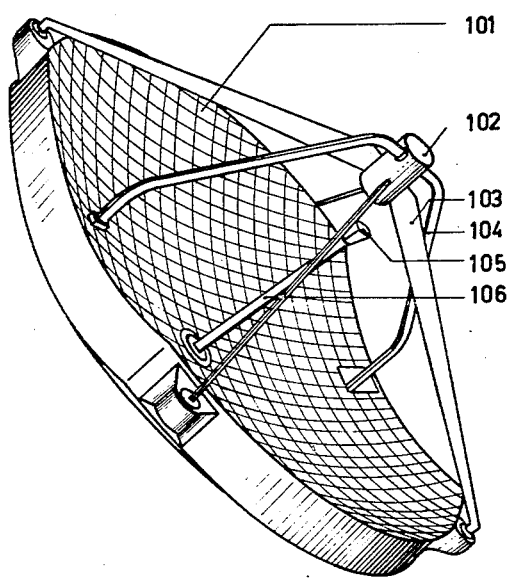
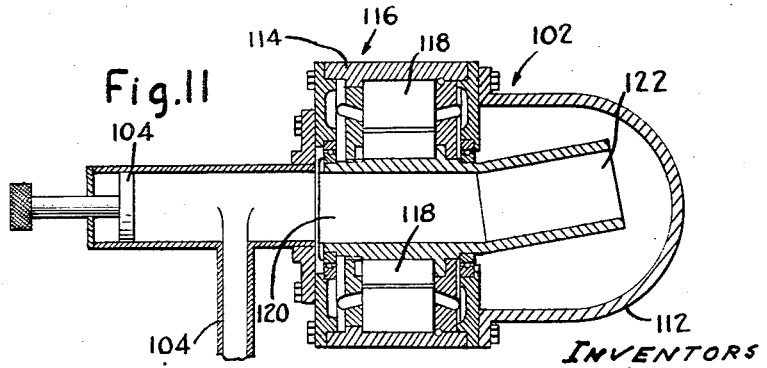
INVENTORS
MAXIMILIAAN HUBERT BODMER
CORNELIS AUGUSTINUS VAN STAADEN
By Haане and Nydich
ATTORNEYS

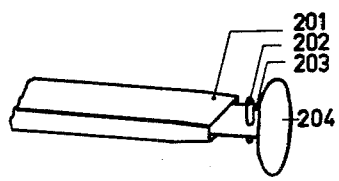
Fig. 2
Fig. 4
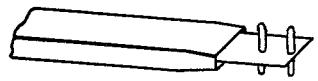
Fig. 3
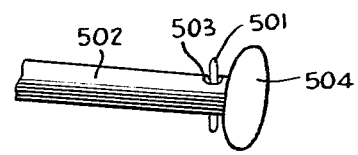
Fig. 5
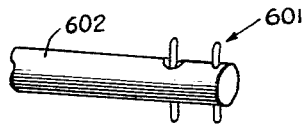
Fig. 6
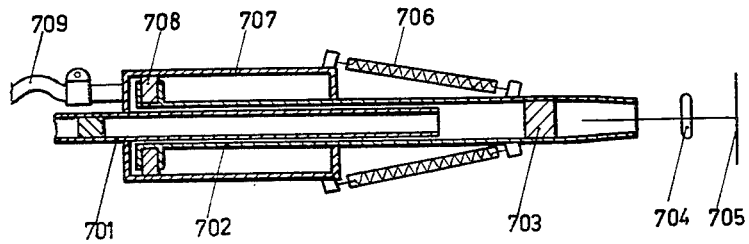
Fig. 7

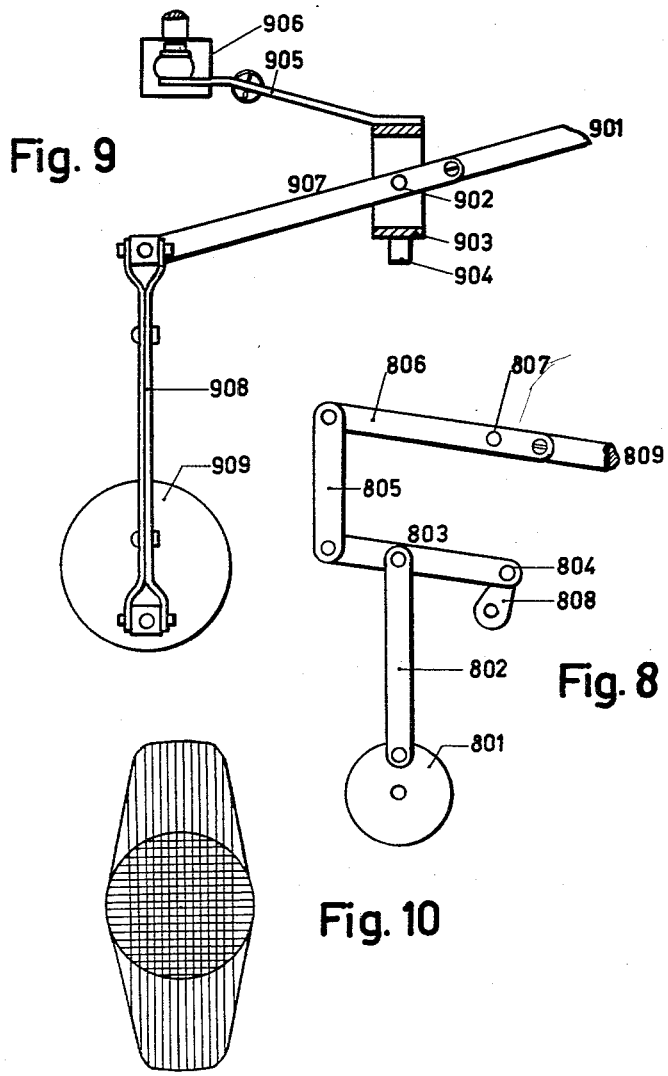

United States Patent Office 2,940,078
Patented June 7, 1960

2,940,078

DIRECTIVE AERIAL

Maximiliaan Hubert Bodmer and Cornelis Augustinus van Staaden, both of Hengelo, Netherlands, assignors to N.V. Hollandse Signaalapparaten, Hengelo, Netherlands, a Dutch corporation Filed July 25, 1957, Ser. No. 674,094

Claims priority, application Great Britain Aug. 7, 1956

8 Claims. (Cl. 343—761)

This invention relates to a radar aerial the beam of which is capable of performing at choice various types of scanning motions. In modern radar apparatus the exact measurement of the target coordinates is, as a rule, effected by means of a conically scanning beam. Such a beam provides highly accurate values of the target coordinates, but is unsuitable for searching for a target. It is therefore desirable that the apparatus should also be able to produce a beam which performs a scanning motion which is more suitable for searching. In certain radar systems this is achieved by causing the complete aerial reflector to oscillate around an elevation axis whilst the aerial system is caused to effect a searching motion around the training axis. In such a system the moment of inertia of the aerial reflector sets a limit to the scanning frequency during searching, and, consequently, also to the searching velocity. In other radar systems the radiator which irradiates the aerial reflector is capable of performing various types of scanning motions, causing the beam to effect either a conically scanning motion or a spiral or a linear scanning motion. Such an aerial requires a complicated scanning system which limits the scanning frequency of all scanning motions, especially of the conical scanning motion. The limitation of this frequency is in many cases unacceptable as it causes the measurement of the coordinates of targets moving at high speed to be less accurate. A radar system which meets high technical requirements is described in the British application for patent Nr. 5746/54 and possesses an aerial for linear scanning as well as a separate aerial for conical scanning, these aerials being coupled so as to perform corresponding motions around parallel or coinciding searching axes whilst a special comparison system permits the aerial for conical scanning to be aimed around a second axis in accordance with the measuring results obtained by the aerial for linear scanning. This system permits the beam concentrating devices as well as the scanning mechanisms of the aerials to be completely adapted to the requirements of the scanning motions to be performed by the beam produced by the aerials. The system is, however, expensive, because it requires two separate systems for concentrating the beams, such as aerial reflectors.

According to the present invention a directive radar aerial, producing a beam which is capable of performing at choice various types of scanning motion, is provided with a beam concentrating device and an eccentrically rotatable wave guide nozzle as well as with a second radiating system which is situated in the space between the eccentrically rotatable wave guide nozzle and the beam concentrating device and is capable of performing at least one type of scanning motion, this radiating system consisting of at least one radiating doublet cooperating with an auxiliary reflecting system which causes a substantial part of that radiation of the second radiating system which otherwise would not reach the beam concentrating device to be reflected in the direction of this device.

When using the new aerial according to the invention, coordinate measurement is effected by means of the conically scanning beam which is generated by means of the eccentrically rotatable wave guide nozzle, whilst the second radiator is in such a position that it will not seriously hamper the production of the conically scanning beam. During searching, the second radiator is active, and performs such motions as are necessary to cause the desired scanning motions of the searching beam, whilst the complete aerial reflector performs a searching motion. The scanning motion performed by the second radiator may be a spiral scanning motion or a linear scanning motion, for instance. The linear scanning motion of the second radiator may in some cases be combined with an auxiliary scanning motion in a second direction as will be described below. Preferably the second radiator is supported by the wave guide or by a coaxial line by which it is fed. The radiating system consists of a single doublet, or, if it is necessary to reduce the width of the beam by which the second radiator irradiates the reflector so as to adapt this width to the dimensions of the reflector, of a system of parallel doublets. In one form of the invention the auxiliary reflecting system consists of a metal reflector, such as a flat piece of sheet metal or a flat piece of metal gauze. In other embodiments it consists of a reflector doublet or a system of reflector doublets.

For the correct operation of the aerial it is essential that the point from which the radiation of the eccentrically rotatable wave guide nozzle appears to emanate should rotate around the focal point of the device concentrating the beam. For the same purpose it is also essential that during its scanning motion the point from which the radiation of the second radiator appears to emanate should be able, during the performing of the scanning motion, to pass through the focal point of the device concentrating the beam. One would suppose that it would be impossible to fulfil these conditions simultaneously and that the system consisting of the second radiator and the auxiliary reflector would not be capable of passing in front of the eccentrically rotatable wave guide mechanism if both radiators were situated in such a position as to satisfy the above conditions. The inventor has shown, however, that when the said conditions are fulfilled there is still space left between the eccentrically rotatable nozzle mechanism and the said second radiating system, permitting the latter system to pass in front of the nozzle mechanism without it being necessary to take special measures, such as shifting the rotatable nozzle mechanism backwards.

The doublet or doublets forming part of the second radiating system can be fed either by a wave guide or by a coaxial line system.

When the radiator for conical scanning is operative its radiation should not be impeded by the presence more or less in front of it, of the inner radiator and more especially of the auxiliary reflector of this inner radiator. The second radiator, therefore, should be moved away from the nozzle for conical scanning when this nozzle is to become operative, and preferably locked in a position in which it permits the passage of the radiation from the said radiator for conical scanning. In an embodiment according to the invention the inner radiator is for this purpose moved by its driving mechanism to an extreme position in its scanning path, and locked in this position.

The presence of the second radiator within the field of the eccentrically rotatable nozzle will nevertheless result in the origination of side-lobes of the conically scanning beam. These side-lobes do not necessarily prevent the exact measurement of the target coordinates and for many purposes the aerial described above is perfectly suitable. Side-lobes, however, will in any case reduce the gain of the aerial and although, as a rule, high gain is only required during the searching operation, whilst the inner radiator is operative, in some cases the reduction of the gain during conical scanning may be unacceptable. In these cases the conically scanning beam should be made substantially free from side-lobes, and when the construction of the scanning mechanism of the second radiator does not permit this radiator to be positioned at a relatively large distance from the eccentrically rotatable wave guide nozzle, special measures must be taken to reduce the formation of side-lobes resulting from reflections on those parts of the second radiating system which are in the immediate vicinity of the eccentrically rotatable wave guide nozzle. For this purpose the support of the second radiator is in certain embodiments constructed in such a way that it permits the second radiator to be shifted backwards, away from the eccentrically rotatable wave guide nozzle. Such measures result in a substantial reduction of the side lobes of the conically scanning beam, but are in most cases superfluous. In other embodiments a special mechanism permits the inner radiator to be moved beyond the extreme position in the path covered during normal scanning operation, causing it to be situated further from the radiator for conical scanning than would be possible without this special measure.

Whilst the nozzle for conical scanning is radiating it is possible that a doublet of the second radiator might become activated as a secondary radiator, thus causing the formation of undesirable side lobes in the radiation diagram. This can, to a certain extent, be prevented by shifting the second radiator backwards, as described above, or by moving it as far as possible away from the nozzle whilst this nozzle is active. Such secondary radiation can, however, be entirely prevented by mounting the second radiator in such a way that its polarisation direction is at right angles or nearly at right angles to that of the radiation from the nozzle.

The beam concentrating device will, as a rule, be a parabolic reflector, but it may also be a suitable lens.

The invention will be better understood from the following description taken in conjunction with the accompanying drawings in which:

Fig. 1 shows an aerial according to the invention for conical and linear scanning.

The Figures 2, 3, 4, 5, and 6 show various types of radiator systems suitable to be used as inner radiator in an aerial according to the invention.

Fig. 7 shows a retractable inner radiator for an aerial according to the invention.

Figs. 8 and 9 show driving systems for the scanning motion of the inner radiator.

Fig. 10 is a schematic representation of a reflector.

In Fig. 1 part 101 is a parabolic reflector which can be aimed around a vertical and a horizontal axis. It cooperates with a radiator system 102 for conical scanning which is supported on four isolating supporting bars such as 103. A wave guide 104 feeds the conical scanning system 102. As shown in Fig. 11, the system 102 includes a cover 112 attached to a housing 114 of a motor 116. The motor 116 is a substantially conventional motor, having a stator 118 interiorly affixed to the housing 114 and a rotor 118 included within said stator in spaced relation and rotatably energized thereby. The rotor 118 has a hollow shaft 120 therethrough. The wave guide 104 terminates at one end of the shaft 120 and one end of a wave guide nozzle 122 is eccentrically attached to the shaft 120 and rotates therewith inside the cover 112. Electrical energy fed into the wave guide 104 is fed through the rotating section comprised of the shaft 120 and the wave guide nozzle 122. The centre of the rotation of the eccentrically rotating wave guide nozzle is situated in such a position that the point from which the radiation from the eccentrically rotating nozzle appears to emanate rotates around the focal point of the parabolic reflector. Consequently, when the conical scanning radiator is operating, a sharp pencil beam is generated, which performs a conical scanning motion.

In the space between the parabolic reflector and the conical scanning radiator system a second radiator system 105 is present. It is supported by a wave guide 106, and is enclosed by a cover of low loss di-electric material; consequently its details cannot be observed. Fig. 2 shows the details of one type of radiator suitable to be used as inner radiator in the aerial according to Fig. 1. The radiating element is a doublet 202 carried by a strip of metal 203 which is supported in the tapered mouth of the wave guide 201. When the doublet is irradiated by wave energy emanating from the wave guide 201 it will radiate electro-magnetic waves. An auxiliary reflector 204, consisting of a flat circular piece of sheet metal, is supported by the strip 203 at that side of the doublet 202 which is away from the parabolic reflector which is to be irradiated by the doublet.

The manner in which the scanning motion of the inner radiator is caused depends upon the type of scanning motion desired. If a spiral scanning is to be performed, the wave guide or other means carrying the inner radiator is supported by means of a gimbal ring situated near the parabolical surface of the reflector. The driving system causing the scanning motion may correspond to that shown in the Figures 2.34 and 2.35 on page 65 of "Radar Scanners & Radomes" by Cady, Karelitz and Turner, (1948). If only a linear scanning motion is required, the wave guide or other means carrying the inner radiator is supported on a shaft near the parabolical surface of the reflector, so that the radiator will be able to swing around this shaft, thus causing a linear scanning motion. A driving system suitable for bringing about such a linear scanning motion is shown in Fig. 8, in which part 809 is a part of the wave guide which feeds the inner radiator and is able to swing around an axis 807. It is connected to a lever 806, which is coupled by means of a connecting rod 805 to a second lever 803 able to swing around a journal 804 and driven by a crank 801 by means of a connecting rod 802. When the crank 801 rotates it will cause the wave guide 809 to oscillate around the axis 807, so that the beam generated by the radiator situated at the end of the wave guide will perform a linear scanning motion. When a switch over from linear scanning to conical scanning is required the crank 809 is brought to a standstill and locked in the position shown in the figure, so that the radiator will be in the lowest point of its scanning path. In order to remove the inner radiator still further from the radiator for conical scanning, the small crank 808 carrying the journal 804 is rotated anti-clockwise through an angle of 180°. Before starting the linear scanning motion, the crank 808 must be returned to the position shown in the figure. If the distance between the inner radiator and the radiator for conical scanning is large enough when the inner radiator is in the extreme position in its scanning path, then the crank 801 can be directly coupled, by means of a coupling rod, to a lever 806 which drives the support of the inner radiator.

In some types of radar apparatus the linearly scanning beam is caused to perform a small auxiliary scanning motion as well, this motion being in a transverse direction with respect to the main scanning motion. Such an auxiliary scanning motion can be applied to permit a fairly accurate measurement of the coordinate angle of a target perpendicular to the main scanning direction, and in this case the fundamental frequency of the auxiliary scanning is equal to the fundamental frequency of the main scanning motion. Another object of the application of an auxiliary scanning motion may be to cover the space scanned during searching almost completely by means of only slightly overlapping scanning paths; in this case the fundamental frequency of the auxiliary scanning motion will be twice the fundamental frequency of the main scanning motion. If it is necessary for the inner radiator to be able to cause such an auxiliary scanning motion it must be supported in a gimbal ring or the like and its driving system must be able to cause oscillating motions of the radiator in both scanning directions. A simple example of a driving system capable of producing such an auxiliary scanning motion is shown in Fig. 9, in which the wave guide 901 carrying the inner radiator is capable of swinging around an axis 902 supported in the gimbal ring 903, which is itself capable of rotating around the axis 904. The gimbal ring carries a lever 905 which is caused to oscillate by means of a cam which is not shown in the figure, and on which a roller 906, mounted at the extremity of the lever 905, is caused to rest as a result of the tension of a spring acting on the lever 905. Consequently the gimbal ring oscillates around the axis 904 and the wave guide 901 partakes in this oscillating motion as a result of which the radiator performs an auxiliary scanning motion. The main scanning motion is performed around the axis 902, and is caused by a rotating crank 909 which is coupled to the lever 907 of the wave guide 901 by means of a connecting rod 908. As the connecting rod must not impede the auxiliary scanning motion, both ends of the connecting rod 908 are constructed so as to be able to rotate around two mutually perpendicular axes as shown in the figure.

In every case in which it is necessary for a wave guide feeding the inner radiator to be able to swing around an axis, it is coupled to a fixed feeding wave guide by means of one of the well known types of rotatable joints. If such a wave guide is supported on a gimbal ring and must be able to perform rotations around two axes, the gimbal support is combined with a universal wave guide joint provided with suitable chokes. If the inner radiator is fed by a coaxial line, then the moving part of the coaxial line is connected by a well known suitable connecting means to a fixed coaxial line.

Fig. 7 shows a retractable movable wave guide feeding the inner radiator. The inner radiator, consisting of the doublet 704 and the small reflector 705, is not, however, carried by this wave guide itself but by another wave guide 702, the cross section of which is just a little larger than that of the wave guide 701, and which can be shifted over the wave guide 701. When the apparatus is at rest the outer wave guide 702 is retained in its retracted position by two cylindrical springs 706. When it is necessary for the inner radiator to become operative it is shifted outwards, for which purpose it is provided with a piston 708 which fits narrowly in the pressure cylinder 707. Compressed gas can be brought into the cylinder 707 through a flexible tube 709, causing the piston 708 and the wave guide 702 to be shifted outwards until the piston rests against the right hand end of the cylinder. The wave guides are closed by blocks of low loss dielectric material, such as 703, or by closed diaphragms so that the compressed gas cannot leak away through the wave guides.

If the polarisation directions of the radiation produced by the two radiators are mutually perpendicular, the parabolic reflector must be able to reflect wave energy of both polarisation directions. For this purpose it must consist of two sets of conductors having different directions. In some cases it may be desirable for the boundaries of the part of the parabolic surface which reflects the wave energy of the one radiator to be different from the boundaries of the part of the parabolic surface which reflects the wave energy of the other radiator. The conically scanning beam, for instance, should preferably be a rotationally symmetric pencil beam so that it is desirable that the part of the parabolic surface concentrating the conically scanning beam should possess a suitable boundary for producing such a rotationally symmetric beam. On the other hand a flat beaver tail beam is preferable for searching, and in order to generate such a beam the reflecting parabolic surface should be large in the direction perpendicular to the largest dimension of the beaver tail beam and small in the direction of the largest dimension of the beaver tail beam. If a common reflector is applied for generating the conically scanning beam as well as the linearly scanning beam, it is, as a rule, impossible to adapt the boundaries of the parabolic reflecting surface to the shape of beam to be produced. If in this case, however, the polarisation directions of the two beams are mutually perpendicular, an adaptation of the boundaries of the reflecting surface is still possible. For this purpose the reflecting surface consists of two overlapping parts, one of which consists of conductors the direction of which corresponds to the direction of the electrical vector of the radiation of one radiator, whilst the other consists of conductors the direction of which corresponds to the direction of the electrical vector of the radiation produced by the other radiator. An example of such an aerial according to the invention suitable for the production of a linearly scanning beaver tail beam and a conically scanning pencil beam is shown in Fig. 10.

The Figures 3, 4, 5, and 6 show other examples of radiating systems suitable to be used as the inner radiating system of an aerial according to the invention. In Fig. 4, instead of one radiating doublet, two radiating doublets are applied for the purpose of restricting the width of the beam of wave energy radiated by the radiating system. Such a system of doublets is specially important if a flat beam is to be produced. Fig. 3 shows a radiating system in which, instead of an auxiliary reflector, a reflector doublet is applied. It is obvious that instead of one radiating doublet and one reflector, doublet systems consisting of more than one doublet may also be used. Fig. 5 shows a radiator system in which one radiating doublet 501 is fed by a coaxial line 502. As may be seen in the figure, the lower half of the radiating doublet is connected to the outer conductor of the coaxial line, whilst the upper half of the doublet passes through an opening 503 in the outer conductor and is connected to the inner conductor of the feeding coaxial line. In this radiator the circular piece of sheet metal is the auxiliary reflecting system 504. In the system shown in Fig. 6 this piece of sheet metal is replaced by a reflector doublet 601 in order to reflect the wave guide energy emanating from the doublet which is fed by a coaxial line 602.

What we claim is:

1. A directive antenna array for selectively performing several different scanning motions, said array comprising, in combination, a parabolic main reflector, an outer radiating system facing the reflector to direct a pencil beam upon the same, and an inner radiating system situated between the outer system and the reflector for directing a beaver tail beam upon said reflector, said outer system including a drive motor having a hollow shaft, a wave guide housed within said shaft for rotation in unison therewith and a wave guide nozzle at the wave guide end facing the reflector and extending eccentrically relative to the rotational axis of the shaft motor, said outer system being mounted in a position in which said guide nozzle rotates in a plane including the focal point of the reflector, and said inner system including at least one radiating doublet and an auxiliary reflector positioned to direct radiation emanating from said doublet upon the main reflector.

2. An antenna array according to claim 1 wherein said doublet is disposed between the nozzle opening and the auxiliary reflector.

3. An antenna array according to claim 1 and comprising a moving means for imparting a reciprocatory scanning motion to the doublet and the auxiliary reflector of said inner system, and locking means for releasably locking the doublet and the auxiliary reflector in one of the limit positions of the scanning motion.

4. An antenna array according to claim 3 and comprising retraction means for selectively retracting said doublet and said auxiliary reflector into a position beyond said limit position of the scanning motion of the inner system.

5. An antenna array according to claim 4 wherein said moving means comprises linkage means including several pivotally hinged links, and wherein said retraction means comprises means for spatially displacing the pivot points of one of said links so as to effect said retraction between said limit position.

6. An antenna array according to claim 1 wherein said nozzle and said inner radiating system are disposed in a relationship such that the polarization directions of the radiation emanating from the nozzle and the inner system respectively are at right angles whereby the main reflector reflects the wave energy of both polarization directions.

7. An antenna array according to claim 6 wherein said main reflector comprises two portions overlapping each other, said portions including conducting elements having a direction parallel to the direction of the electrical vector of the radiation fed to said main reflector by one of the systems, and the other including conducting elements having a direction parallel to the direction of the electrical vector of the radiation fed to the main reflector from the other system.

8. An antenna array according to claim 1 wherein said radiating doublet and said auxiliary reflector are mounted on a wave guide axially slidable relative to said nozzle of said inner radiating system for controlling the spacing therebetween.

References Cited in the file of this patent

UNITED STATES PATENTS

| | | |
|---|---|---|
| 2,422,579 | McClellan | June 17, 1947 |
| 2,430,568 | Hershberger | Nov. 11, 1947 |
| 2,441,574 | Jaynes | May 18, 1948 |
| 2,526,314 | Alexanderson et al. | Oct. 17, 1950 |
| 2,605,419 | Van Atta | July 29, 1952 |
| 2,759,182 | Chaffee | Aug. 14, 1956 |

FOREIGN PATENTS

| | | |
|---|---|---|
| 607,294 | Great Britain | Aug. 27, 1948 |